(12) United States Patent
Ristau

(10) Patent No.: US 7,690,610 B2
(45) Date of Patent: Apr. 6, 2010

(54) SUCTION-TYPE HOLDING DEVICE

(75) Inventor: Harald Ristau, Brackel (DE)

(73) Assignees: Patrick Schmidt, Seevetal (DE); Gert Potters, Rosengarten (DE)

( * ) Notice: Subject to any disclaimer, the term of this patent is extended or adjusted under 35 U.S.C. 154(b) by 430 days.

(21) Appl. No.: 11/579,404

(22) PCT Filed: Feb. 9, 2005

(86) PCT No.: PCT/DE2005/000214

§ 371 (c)(1),
(2), (4) Date: Nov. 2, 2006

(87) PCT Pub. No.: WO2005/106262

PCT Pub. Date: Nov. 10, 2005

(65) Prior Publication Data
US 2007/0241246 A1 Oct. 18, 2007

(30) Foreign Application Priority Data
May 3, 2004 (DE) .................. 10 2004 022 038

(51) Int. Cl.
A45D 42/14 (2006.01)
(52) U.S. Cl. .................. 248/206.2; 248/205.5
(58) Field of Classification Search .............. 248/205.5, 248/206.2, 206.3
See application file for complete search history.

(56) References Cited

U.S. PATENT DOCUMENTS

| 2,940,713 | A | * | 6/1960 | Van Dusen | 248/205.8 |
| 4,133,575 | A | * | 1/1979 | Mader | 296/95.1 |
| 5,029,786 | A | * | 7/1991 | Wu | 248/205.7 |
| 5,176,346 | A | * | 1/1993 | Liu | 248/206.1 |
| 6,663,077 | B2 | * | 12/2003 | Zou | 248/683 |
| 6,666,420 | B1 | * | 12/2003 | Carnevali | 248/205.8 |
| 6,827,344 | B1 | | 12/2004 | Ristau | |
| 2002/0190170 | A1 | | 12/2002 | Ting | |
| 2005/0119700 | A1 | * | 6/2005 | Klobe | 606/237 |

FOREIGN PATENT DOCUMENTS

| DE | 2124511 | 5/1971 |
| GB | 491991 | 9/1938 |
| GB | 1084559 | 9/1967 |
| JP | 9151929 | 6/1997 |

* cited by examiner

Primary Examiner—Gwendolyn Baxter
(74) Attorney, Agent, or Firm—Charles A. Muserlian

(57) ABSTRACT

The invention relates to a suction-type holding device (1) to be fixed to fastening surfaces (17). Said holding device comprises a hollow suction base (2) that is open towards the fastening surface (17) and encompasses a central piece (11), and a sealing edge (5) which is provided with an elastic material at least towards the fastening surface (17) and can be placed on the fastening surface (17) along with the suction base (2) such that a suction chamber (30) that is gas-tight sealed towards the outside is embodied between the bottom face (9) of the suction base (2) and the fastening surface (17). The inventive suction-type holding device (1) further comprises contact pressure transmitters (8) and pressing means (18) for transmitting the contact pressure to the wall (7) of the suction base, thus applying additional contact pressure used for firmly attaching the suction-type holding device.

23 Claims, 5 Drawing Sheets

SUCTION-TYPE HOLDING DEVICE

This application is a 371 of PCT/DE2005/000214 filed Feb. 9, 2005.

The invention relates to a suction-type holding device for fixing objects to fastening surfaces.

Suction-type holding devices are known, for example, as suction feet fastenings. The suction feet of these suction feet fastenings consist of an elastic material such as rubber or plastic. The technical effect of these suction feet is that a chamber is formed between the hollow interior and the fastening surface on which the suction foot is to be fastened when said foot is placed thereon. The air is pressed out of the chamber by pressing the suction foot onto the fastening surface; said air escapes between the sealing edge of the suction foot and the fastening surface. When the pressure is reduced, as a result of the resilient elasticity of the suction foot a vacuum is established in the chamber which sucks the suction foot firmly on the fastening surface.

The known suction-type holding devices aim to achieve good adhesion on smooth fastening surfaces. Adhesion to less smooth, rough surfaces poses a problem. Such less smooth surfaces are, for example, the more or less horizontal upper covers of instrument panels in motor vehicles, the so-called dashboard.

Known from GB 491,991 is a suction holding device comprising a cover made of a springy material on a resilient suction base. When the cover is pressed centrally towards the suction base, the convex shape of the cover is converted into a concave shape. When the pressure is reduced, the cover returns to its convex shape and thereby moves the centre of the suction base away from the bearing surface so that a vacuum is formed between the suction cup and the bearing surface. A suction holding device of this type differs from the present invention in that the soft suction base itself cannot produce any force directed away from the bearing surface after releasing the contact pressure. This can be disadvantageous for the adhesive capacity of the suction holding device because the extent of the vacuum is merely determined by the restoring force of the cover.

Known from GB 1,084,559 is a suction holding device with a bell-shaped suction base and cover wherein, unlike GB 491,991, the centre of the suction base and cover are not connected non-displaceably but displaceably with respect to one another. For this a threaded bolt sits on a disk-like rigid metal plate incorporated in the suction base. The metal plate has perforations. The centre of the suction surface is moved away from the bearing surface to produce the vacuum by means of a head with a threaded hole placed on the cover. This suction holding device also has no stabilising framework with arms and the rigid metal plate inserted in the suction base cannot produce any additional restoring force in response to the reducing contact pressure because it is not elastically deformable.

Many of the known bell-shaped adhesive suction devices have the disadvantage that as a result of the restoring force of the suction cup in a bell shape, the angle between the sealing edge and the bearing surface becomes larger as the vacuum is reduced, resulting in an unbraked radially inwardly directed restoring force and the adhesive suction device falls off.

It is the object of the invention to provide a suction-type holding device which adheres securely, firmly and durably even on rough fastening surfaces.

This object is achieved according to the invention by a suction-type holding device for fixing on fastening surfaces having the features of the independent claim 1.

Preferred embodiments are the subject matter of the dependent claims or described hereinafter.

The advantage of the invention is that the pressure used for the fixing is applied not only from the central piece but specifically also via the suction base wall and thus air can be pressed away from the vacuum chamber more effectively. This is particularly important with increasing elasticity/softness of the suction base. On the basis of this design, the adhesiveness is also astonishingly good on rough fastening surfaces. After fixing the suction-type holding device, the contact pressure transmitters in cooperation with the central piece and the pressing means maintain a tensile stress at the central piece away from the fastening surface.

The contact pressure transmitters are elastically deformable in height and consist, for example, of an annular bead or individual annularly arranged knobs. The pressing means which press against the bead of the knobs consist of a cover, which presses from outside against the wall of the suction base via the contact pressure transmitters.

The bead or the knobs are optionally provided on the outer side of the suction base or on the side of the pressure-reinforcing cover facing the suction base. The same transmission of pressure is achieved in both cases.

The contact pressure transmitters are however preferably an integral component of the suction base wall and furthermore preferably made of the same material. In the relaxed state, the contact pressure transmitters can only be in communication with the pressing means or only with the suction base wall. In the rest state of the suction-type holding devices, these contact pressure transmitters are preferably in contact with the pressing means and with the suction wall base.

If the ring of the contact pressure transmitters when viewed from the central piece is located on a specific radius which, for example, when seen from the central piece, extends over about ¼ to ⅚, in particular ⅓ to ⅔, of the total radius of the suction cup, the contact pressure additionally has a shape-stabilising effect on the inherently elastic wall of the suction base.

The suction base and preferably also the contact pressure transmitters consist in particular of a material having a Shore hardness of less than 18 (in each case Shore A), e.g. between 10 and 18, preferably in the range from 11 to 14. Shore hardnesses in the range of 12 (i.e. +/−0.5) are particularly favourable. Such low Shore hardnesses ensure that the sealing edge adapts well to unevenesses of the fastening surface and accordingly seals well. The sealing edge corresponds to the bearing surface of the suction base on the fastening surface.

Elastic materials such as rubber and in particular, thermoplastic elastomers have proven to be particularly suitable materials for the suction base. Suitable materials are, for example, styrene block copolymers, styrene block terpolymers (styrene ethylene butylene styrene block polymers) and styrene diene polymers.

A very soft material of the suction base has the disadvantage that the dimensional stability suffers. In order to nevertheless impart this dimensional stability to the suction base, a stabilising framework, e.g. in the form of a stabilising spider, provided with spider arms emanating from a central piece, is embedded in the material of the suction base. The shape of the stabilising spider determines the bell shape of the suction cup.

The stabilising framework consists of a hard material which is generally not elastic per se, such as metal or plastic, but is springy. However, the arms of the stabilising framework can be bent back in a resilient manner. If plastic is used, this should then be relatively thermally stable. In particular, this comprises fibre-reinforced polyolefins and in particular, glass-fibre-reinforced polypropylene.

The stabilising framework comprises arms emanating from a central piece which are optionally interconnected and cover at least half, preferably at least three quarters of the radius of the suction base.

According to a preferred embodiment, the spider arms of the stabilising framework emanating from the central piece are provided at the top with at least one terminal spacer in each case, which is substantially embedded on all sides in the soft-elastic material having a Shore hardness (according to DIN 53505) of less than 18 and which approximately has the height of the coating on the spider arms. The spacers facilitate the injection moulding of the suction base and fix the arms in the injection mould.

Three sealing lips are provided, for example, at the sealing edge to the underside of the suction base, these sealing lips being concentric and located on increasingly smaller diameters with respect to the central piece.

A cover placed over the suction base, which is connected to the central piece of the suction base, is used for depressing the bead. The pressing means or the cover can also be part of the object to be fastened or its holder, possibly a holder for a mobile telephone.

The cover consists of an inherently non-elastic solid material and is preferably concave, e.g. as partial area of a spherical surface and more preferably can be deformed by a contact pressure acting centrally on the cover, as exerted by fingers, such that the concave shape flattens and the centre of the cover strives to return to the stress-free concave original shape with a restoring force.

The cover can have spacers internally on the outer edge in the form of one or more circular or partly circular ribs or punctiform knobs which are supported against the outer suction base wall in the attached state and prevent tilting of the cover.

The cover substantially completely covers the suction base. Optionally, it can be desirable if the suction base is not covered at the outermost edge and forms a join-like edge along which good wiping can be carried out.

After yielding to the contact pressure, the concave cover deformed elastically by the contact pressure moves the central piece under tension further from the fastening surface with a restoring force.

The cover is preferably non-detachably connected to the central piece of the suction base by a locating device.

The mounting device for the objects to be held, for example, comprises a central screw connection which connects the cover to the central piece of the suction base and is also used to secure objects.

In order to allow objects secured with the holding device to be aligned with regard to optimal visibility, the mounting device in particular has a screw connection, preferably a ball joint to which objects can be attached.

The ball joint preferably consists of a ball disposed on the ball connection and a matching socket which bears a fixing support for objects. Ball and socket can be fixed with respect to one another by adjusting screws, e.g. in the form of setscrews. Optimal sight adjustment can easily be made by means of the socket.

The screw connection can comprise a fixing plate with which the cover can be pressed onto the central piece of the suction base. Provided on the fixing plate is a Velcro closure not shown on which the object can be fixed with the counterpiece of the Velcro closure. This is a variant to the ball joint.

Ball joint and Velcro closure also have the further logical purpose that when mounted underneath the windscreen on the upper instrument panel, the mounted objects detach from the suction-type holding device in the event of a collision.

The suction-type holding device can also be provided with a claw disk provided with optionally further mounting devices turned on the cover. For this purpose, the cover is embodied as substantially round but comprises edge zones at a shorter distance from the centre point of the cover and edge zones at a greater distance from the centre point of the cover, distributed approximately uniformly over the circumference. The claw disk is placed onto the edge zones at a shorter distance from the centre point of the cover and is fixed by turning in the direction of the edge zones at a greater distance from the centre point of the cover by engagement of the claws into the further edge zones of the cover.

In order to prevent any twisting of the fixed claw disk, locating devices are provided over which the claw disk is initially rotatably guided so that it is finally engaged in the anchoring position secure against rotation.

The subject matter of the invention is explained hereinafter with reference to FIGS. 1 to 14 as an example, In the figures:

FIG. 1 is a plan view of the suction base of a suction-type holding device which can adhere to rough fastening surfaces, FIG. 2 is a side view of the suction base of the suction-type holding device from FIG. 1, FIG. 3 is a section through the suction-type holding device when mounted, FIG. 4 is a side view of the shape-stabilising insert in the form of a stabilising spider with a central piece and spider arms emanating therefrom, which is inserted into the material of the suction base of the suction-type holding device, FIG. 5 is a side view of the stabilising spider from FIG. 4 in the raw state, FIG. 6 shows the pressure reinforcing cover for mounting the suction-type holding device, FIG. 7 is a side view showing a mounting screw for the suction-type holding device with which this is fixed on a fastening surface, FIG. 8 shows a modified mounting screw with a ball joint for fixing an object.

FIG. 9 shows a section through the suction base and the cover. The central piece has a recess for a locating element to fix cover and central piece with respect to one another. Supporting grooves prevent any tilting of the cover when in place.

FIG. 10 shows a three-dimensional view of the stabilising spider with spacers on the spider arms and a recess for the locating element in the central piece.

In FIGS. 11 and 12 various mounting devices are shown as a rod holder. In FIG. 11 the receptacle for a rod is part of the cover and in FIG. 12, part of a claw plate placed on the cover.

The clamping shoe is mounted securely against rotation by locating holes in the plate and corresponding knobs under the shoe.

Figure 1:
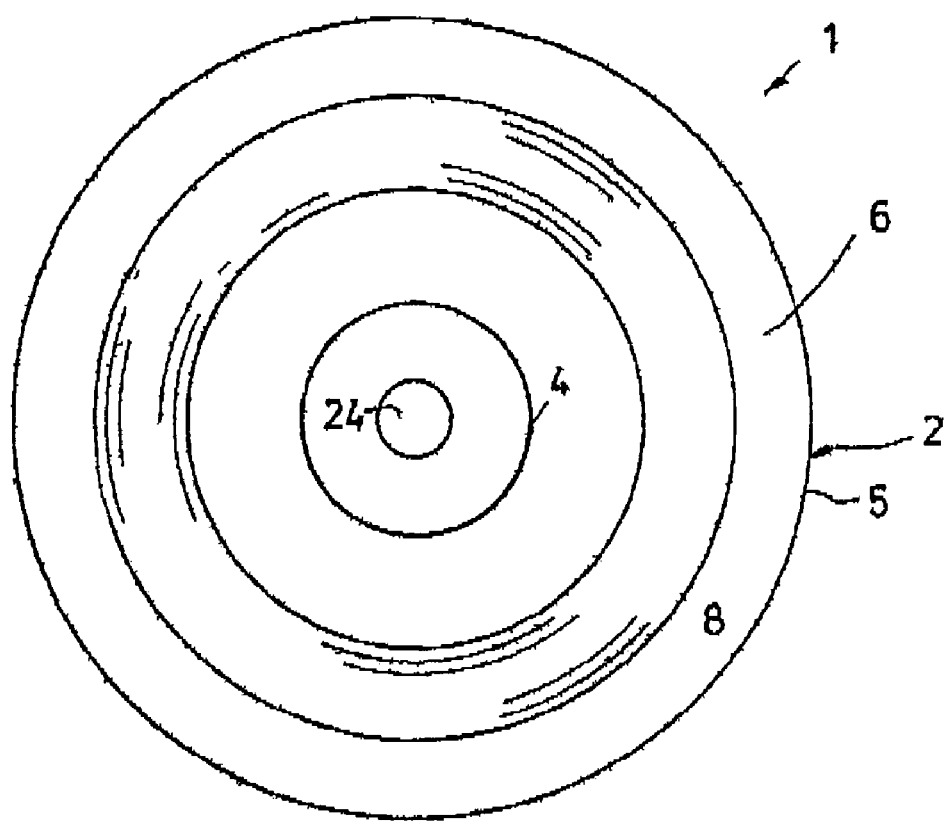

The suction-type holding device 1 according to the figures comprises a suction base 2. It can be seen in FIG. 1 that the suction base 2 has a mounting device 4 at the centre. A contact pressure transmitter 8 is provided between the mounting device 4 and the sealing edge 5 of the suction base 2 on the outer side 6 of the suction base wall 7. This contact pressure transmitter 8 is shown as an annular bead which can be deformed elastically in height; it can consist of individual knobs. The knob variant is not shown.

Figure 2:
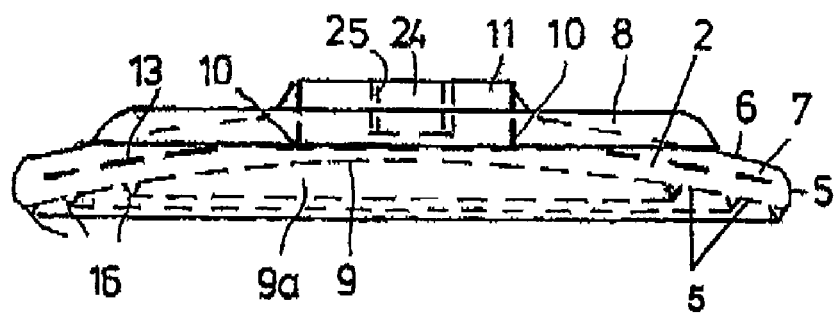
Figure 4:
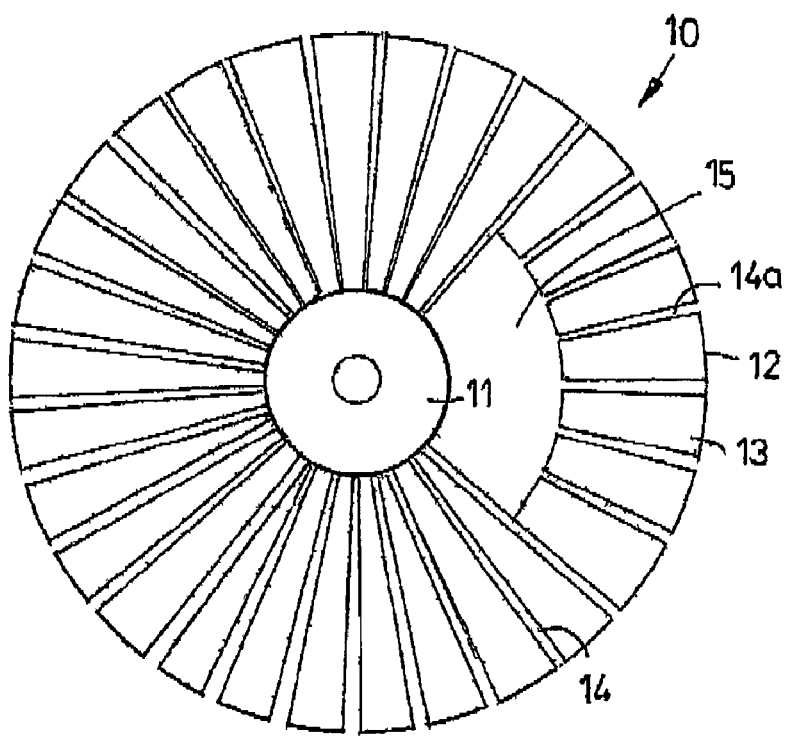

As shown in FIG. 2, the suction base 2 is embodied as hollow on its underside 9 like a bell. A suction chamber 30 is thereby formed, A stabilising framework in the form of a stabilising spider 10 is embedded in the suction base wall 7. The stabilising spider 10 is shown in plan view in FIG. 4; this consists of plastic or metal. At its centre said spider consists of a preferably cylindrical central piece 11 and spider arms 13 projecting from said central piece towards the spider edge 12. The spider arms 13 are separated from one another by means of separating slots 14 which extend from the central piece 11 as far as the spider edge 12. However, it is also possible that the separating slots 14 are only applied approximately from half (14a), starting from a solid piece 15, as is indicated for some spider arms in FIG. 4.

Figure 5:
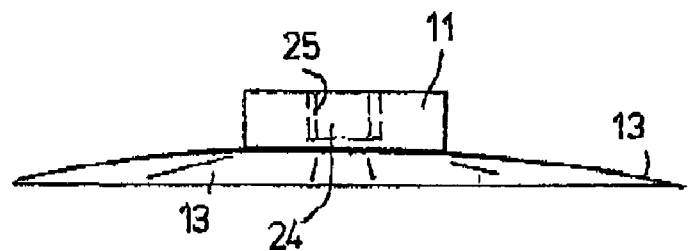
Figure 10:
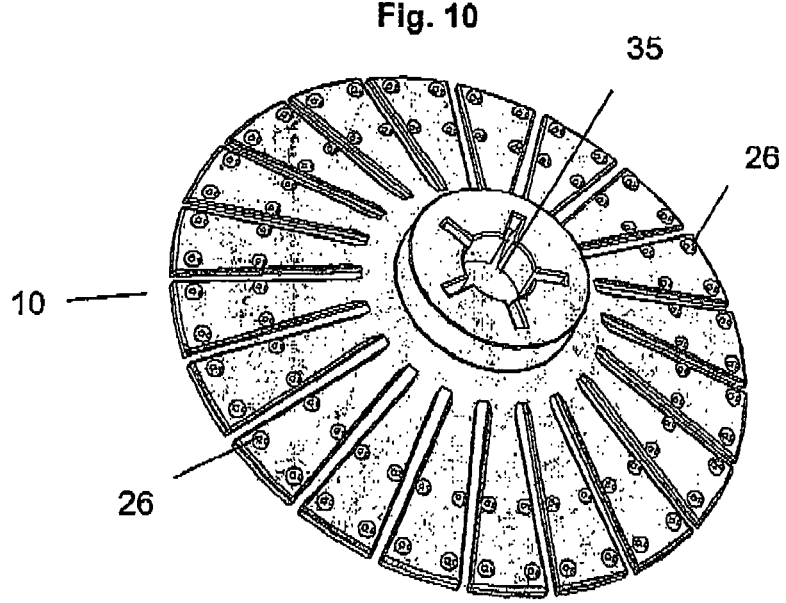

FIG. 5 shows the stabilising spider 10 in side view. The central piece 11 and the spider arms 13 can be seen. The spider arms 13 can be bent up and down against a restoring force in the direction of the rest position. The stabilising spider 10 is also shown in FIG. 10. Spacers 26 and a locating recess 35 in the central piece 11 can be additionally seen in FIG. 10.

If FIG. 2 is considered, the stabilising spider 10 can be clearly seen inside the suction base 2 because the parts 11, 13 from FIG. 5 are shown by thicker dashed lines. Three concentric sealing lips 16 which project downwards and which are located in the area of the sealing edge 5 can be seen on the underside 9 of the suction base 2. The sealing lips 16 run concentrically to the central piece 11 and on diameters which become smaller towards the central piece.

The material of the suction base 2 sprayed around the stabilising spider 10 is very soft. Its Shore hardness (type A) lies in the range of 10 to 18, preferably 11 to 14, in particular around 12. Thus, the suction base 2 adheres very well to rough fastening surfaces by suction. The dimensional stability and the resilient elasticity of the suction base body is ensured by the injection-moulded stabilising spider 10.

Figure 6:
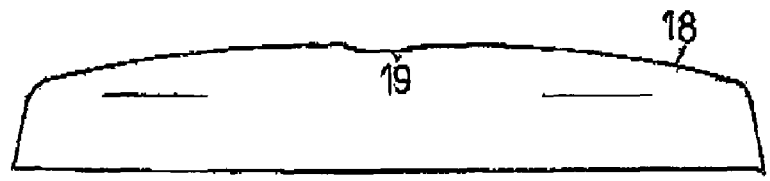
Figure 7:
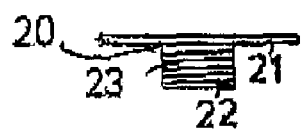

FIG. 6 shows a cover completely covering the suction base 2 as pressing means 18. For mounting, a fixing screw 20 is inserted through a central opening 19 in the pressing means 18 as shown in FIG. 7. This fixing screw 20 consists of a head plate 21 and a screw shaft 22 with external thread 23. An inner hole 24 of the central piece 11 has an internal thread 25. The pressing means 18 is placed with the fixing screw 20 over the suction base 2 as in FIG. 2. The pressing means 18 is upwardly curved and is pressed down by means of the fixing screw 20 so that the screw shaft 22 can be screwed into the internal thread 25 of the inner hole 24 of the central piece 11.

Figure 3:
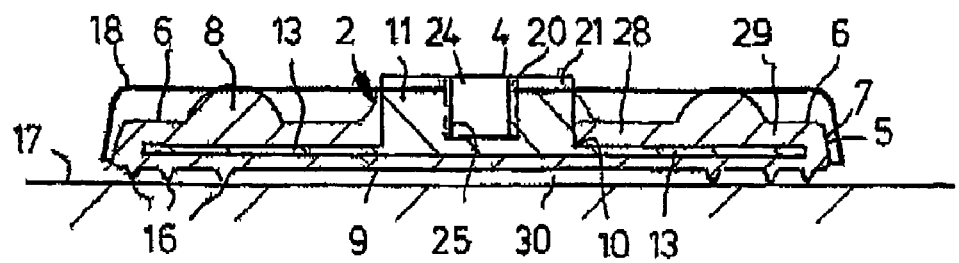

It can be seen from FIG. 3 that the head plate 21 presses the pressing means 18 onto the central piece 11. The depressed central part 28 of the suction base strives to tilt the edge zone 29 upwards. However, this is prevented by the contact pressure transmitter 8 which holds the edge zone 29 down. The sealing lips 16 are therefore securely pressed against the fastening surface 17. A vacuum is produced in the suction chamber 30 formed between the underside 9 of the suction base 2 and the fastening surface 17 but this is only so high as to avoid any damage to the fastening surface 17. In addition, the suction chamber 30 has a very flat extension.

Figure 9:
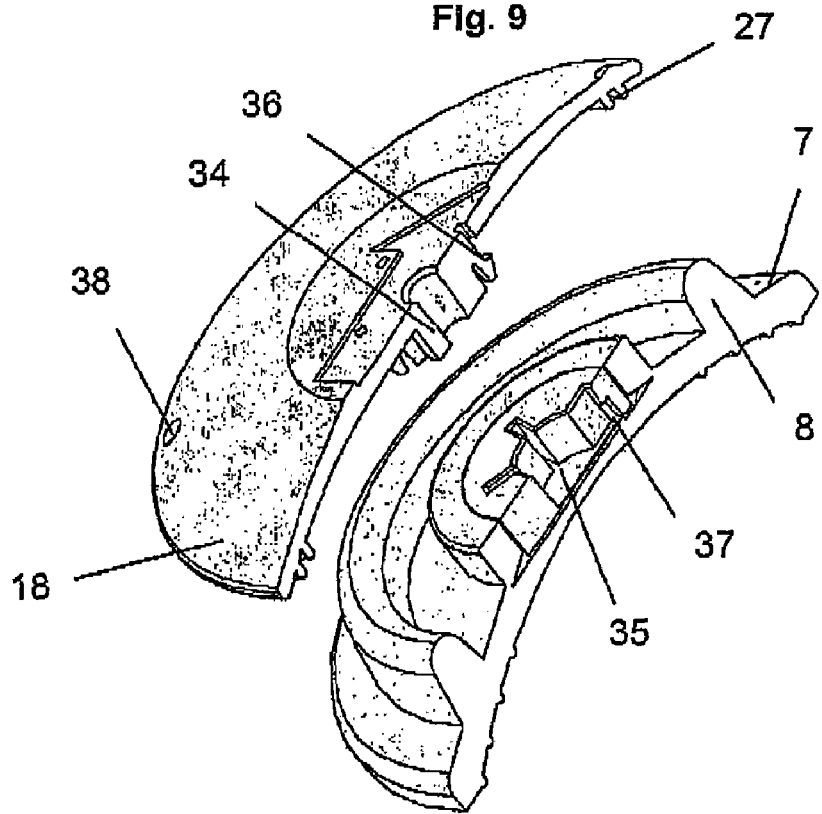
Figure 12:
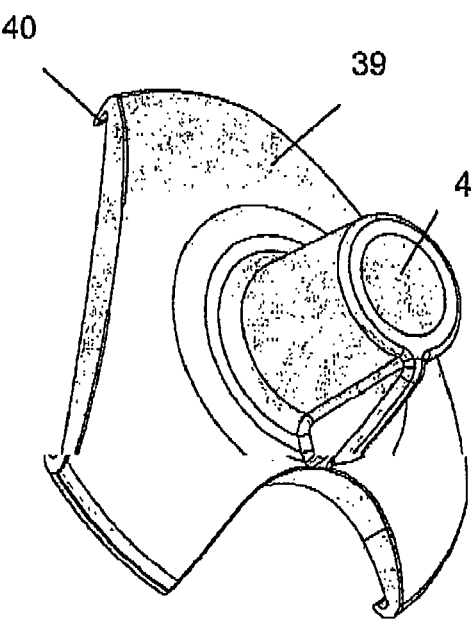

FIG. 9 shows a section through cover 18 and suction base 2. The locating recess 35 with counter-bearing 37 for the counter-hook 36 of the locating flange 34 as well as the contact pressure transmitter 8 can be identified particularly well. The locating knobs 38 engage in corresponding recesses of a claw disk 39 not shown, as is shown for example in FIG. 12. Supporting grooves 27 supported on the suction base wall 7 are provided so that the cover 18 does not tilt when in place. The supporting grooves 27 can also be embodied as supporting knobs.

Figure 8:
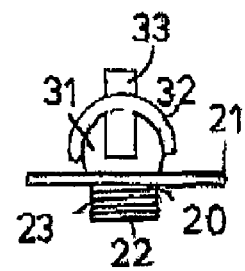

Objects can be fixed to the suction-type holding device. This can either be achieved by means of the fixing screw 20 screwed into the internal thread 25 or by means of a Velcro closure not shown. FIG. 8 shows another variant which consists of a ball 31 connected to the fixing screw 20 and a socket 32 placed on the ball 31, said socket bearing a fixing support 33.

Figure 11:
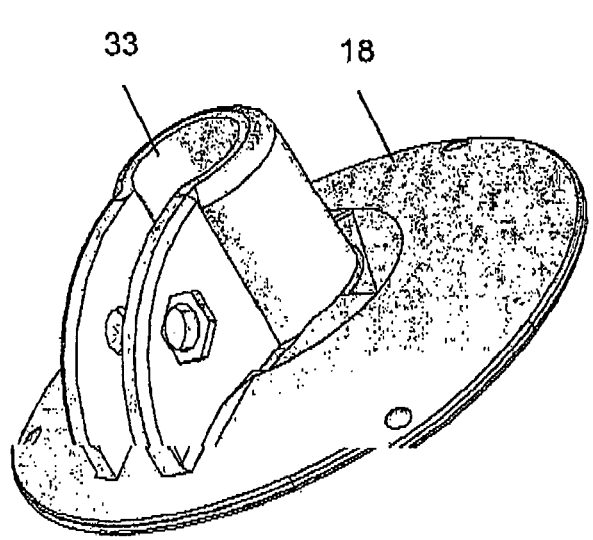

FIG. 11 shows a rod holder which can be clamped by means of a machine screw as a mounting device 4. The fixing support 33 is embodied as a rod sleeve, is attached directly to the cover 18 and has a lateral stabilising strut.

Figure 13:
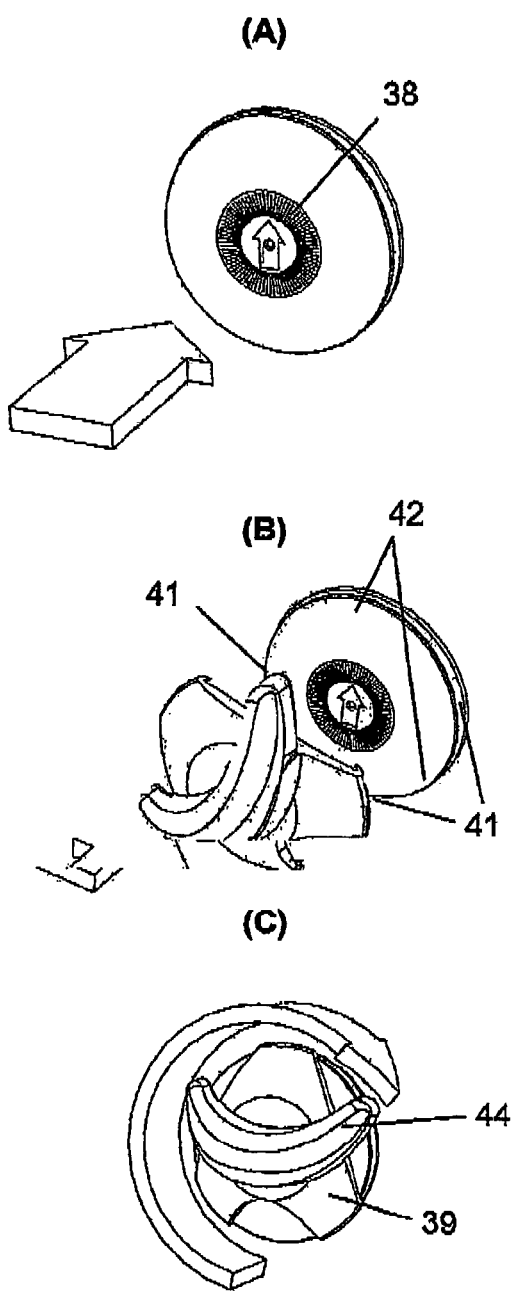
FIG. 13 illustrates how the claw plate is placed (B) on the suction-type holding device (A) fixed to a wall and stays in a suitably aligned position for the two hooks by turning over locating teeth (C).

Alternatively, a claw disk 39 can be placed on the flat cover 18. The cover, which is not completely round, has three protuberances (edge zones 42) in which claws 40 of the claw disk 39 can be fixed by turning. The claw disk 39 is positioned by aligning the claws 40 with three corresponding protuberances (edge zones 41). The process of fixing the claw disk 39 is shown schematically in FIG. 13 (sequence A to C). The arrow on the cover 18 indicates the position at the top.

Figure 14:
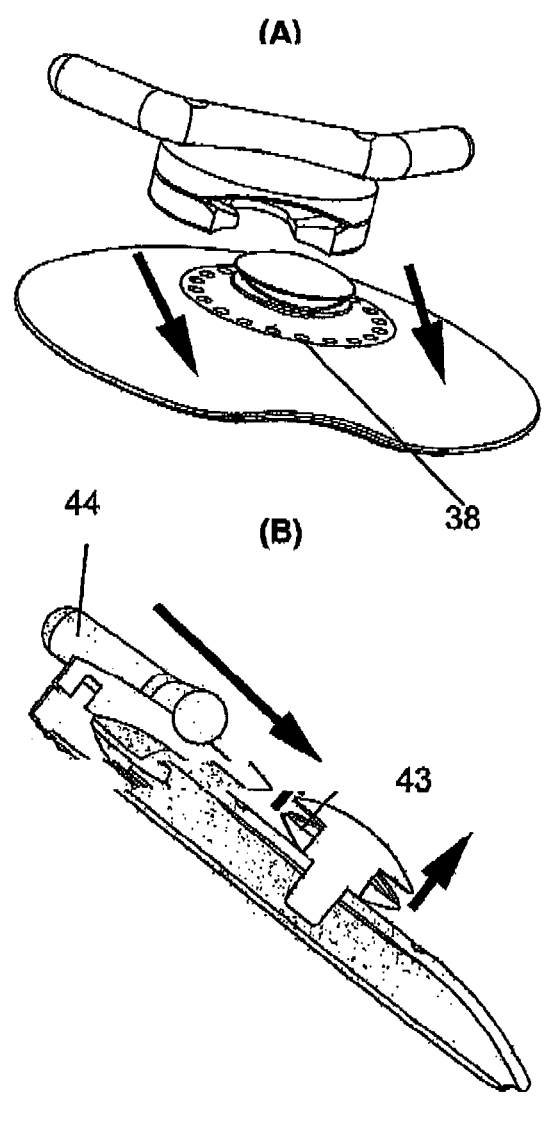
FIG. 14 shows how a double hook is placed on a spring clamping shoe and is fixed by means of two lower spring cheeks engaging in the shoe.

FIG. 14 shows that the mounting device 4 can alternatively be fixed by means of a shoe which can be rotated about a dome with spring cheeks 43. The double hook 44 is secured against twisting by locating devices 38 when the spring cheeks 43 locate downwards in a recess in the interior of the shoe.

The invention claimed is:

1. A suction-cup holding device (1) for fixing on fastening surfaces (17), comprising
   a hollow suction base (2) which is open towards the fastening surface (17) and is provided with a central piece (11) and
   a sealing edge (5) which comprises an elastic material at least towards the fastening surface (17) and with which the suction base (2) can be placed on the fastening surface (17) so that an outwardly gas-fight sealed suction chamber (30) is formed between the underside (9) of the suction base (2) and the fastening surface (17),
   the suction-cup holding device (1) comprises contact pressure transmitters (8) which are elastically deformable in the direction of the pressure applied and are located between the central piece (11) of the suction base (2) and the outer sealing edge (5') on the suction base—at a distance from the central piece (11) and from the outer sealing edge (5') in each case—on the outer side (6) of the suction base wall (7), and
   the suction-cup holding device (1) comprises a pressing means (18) for transferring the contact pressure to the suction base wall (7), wherein the pressing means (18) is configured in such a manner that at least under the contact pressure exerted on the central piece (11) in the direction of the fastening surface (17), said means is in communication with the central piece (11), the contact pressure transmitter(s) (8) and via said contact pressure transmitter(s) (8), with the suction base wall (7),
   wherein the pressing means (18) which is formed to be able to put pressure from outside against the suction base wall (7) of the suction base (2), comprises of a cover secured to the central piece (11), which acts on the contact pressure transmitter(s) (8) at least under contact pressure,
   wherein
   a stabilizing framework (10) with arms (13) emanating from the central piece (11) is embedded in the material of the suction base (2) or is placed thereon and the arms (13) cover at least half the radius of the suction base (2) and can be bent resiliently.

2. The suction-cup holding device of claim 1, wherein the contact pressure transmitters (8) consist of a substantially annular bead or individual knobs which are arranged independently preferably substantially concentrically to the central piece (11).

3. The suction-cup holding device of claim 1, wherein the contact pressure transmitters (8) consist of a rubber-elastic material, in particular having a Shore hardness (according to DIN 53505) of less than 18, preferably between 10 and 18, and independently thereof, the contact pressure transmitters (8) are preferably an integral part of the outer side (6) of the suction base wall (7) and consist of the same material.

4. The suction-cup holding device of claim 1, wherein the pressing means (13) have a concave shape which can be more preferably deformed by the action of force centrally elastically in the direction of the centre.

5. The suction-cup holding device of claim 1, wherein the cover substantially covers the suction base (2).

6. The suction-cup holding device of claim 1, wherein after yielding to the external contact pressure, the pressing means (18) additionally moves the central piece (11) under tension away from the fastening surface (17) with a restoring force, preferably also caused by the elastic deformation of the pressing means (18) at the centre of the cover previously effected by the contact pressure.

7. The suction-cup holding device of claim 1, wherein the contact pressure transmitters (8) are provided as desired on the outer side (6) of the suction base (2) or on the side of the pressing means (18) facing the suction base (2) or form part thereof.

8. The suction-cup holding device of claim 1, wherein the suction base (2), at least jute area of the scaling edge (5), preferably also in the area of the suction base wall (7) and optionally the entire suction base (2), apart from the central piece (11) for this case, consists of a material having a Shore hardness (according to DIN 53505) of less than 18.

9. The suction-cup holding device of claim 1, wherein the suction base (2) comprising a thermoplastic elastomer.

10. The suction-cup holding device of claim 1, wherein the arms of the stabilizing framework (10) cover at least three quarters of the radius of the suction base.

11. The suction-cup holding device of claim 10, wherein the stabilizing framework (10) consists of a springy material of metal.

12. The suction-cup holding device of claim 10, wherein the stabilizing framework has a bell shape, in particular in a flat circular cone shape.

13. The suction-cup holding device of claim 1, wherein the arms (13) of the stabilizing framework (10) emanating from the central piece (11) are provided at the top with at least one spacer (26) in each case, which is substantially embedded on all sides in the soft-elastic material having a Shore hardness (according to DIN 53505) of less than 18, said spacer approximately has the height of the coating on the arms (13) of the stabilizing framework and in particular is arranged from the centre of the arms on the outer edge of the arms (13) of the stabilizing framework.

14. The suction-cup holding device of claim 1, wherein the contact pressure transmitters (8) when viewed from the central piece (11) are arranged in a radial region which extends from ¼ to ⅚, in particular from ⅓ to ⅔ of the total radius of the suction cup.

15. The suction-cup holding device of claim 1, wherein one, two or three circumferential sealing lips (16) are provided on the sealing edge (5) on the underside (9) of the suction base, said sealing lips preferably being concentric and more preferably the distance from the outer sealing lip to the next second sealing lip located further inwards being smaller than the distance of the second sealing lip from the third sealing lip.

16. The suction-cup holding device of claim 1, wherein the pressing means (18) is detachably connected to the central piece (11) of the suction base (2).

17. The suction-cup holding device of claim 1, wherein amounting device (4) detachably connects the pressing means (18) and the suction base and the mounting device (4) preferably has a central screw connection (20) which connects the pressing means (18) to the central piece (11) of the suction base (2) and/or receives a fixing device for objects.

18. A suction base (2) as a component of a suction-cup holding device (1) for fixing on fastening surfaces (17), which is open towards the fastening surface (17) and is hollow and is provided with a central piece (11) and a sealing edge (5), wherein said suction base (2) comprises an elastic material at least towards the fastening surface (17) with which the suction base (2) can be placed on the fastening surface (17) so that an outwardly gas-tight sealed suction chamber (30) is formed between the underside (9) of the suction base (2) and the fastening surface (17), and a springy stabilizing framework (10) in the form of a stabilizing framework with springy arms (13) emanating from the central piece (11) is embedded in the elastic material of the suction base (2) or is placed thereon and the arms (13) cover at least half the radius of the suction base (2) and can be bent resiliently.

19. The suction base of claim 18, wherein the arms (13) which are optionally interconnected, cover at least half, preferably at least three quarters of the radius of the suction base (2).

20. The suction base of claim 18, wherein the arms of the stabilizing framework can be bent resiliently.

21. The suction base of claim 18, wherein the arms (13) of the stabilizing framework (10) emanating from the central piece (11) are provided at the top with one terminal spacer (26) in each case, which is embedded substantially on all sides in the elastic material and approximately has the height of the coating on the arms (13).

22. The suction base of claim 18, wherein the elastic material of the suction base (2) has a shore hardness of less than 18 and the springy stabilizing framework (10) is embedded in the elastic material.

23. The suction base of claim 18, wherein the suction base (2) has a bell shape.

* * * * *

UNITED STATES PATENT AND TRADEMARK OFFICE
CERTIFICATE OF CORRECTION

| | | |
|---|---|---|
| PATENT NO. | : 7,690,610 B2 | |
| APPLICATION NO. | : 11/579404 | |
| DATED | : April 6, 2010 | |
| INVENTOR(S) | : Harald Ristau | |

It is certified that error appears in the above-identified patent and that said Letters Patent is hereby corrected as shown below:

Col. 6, Claim 1, as printed in line 9, "gas-fight" should be --gas-tight--

Col. 7, Claim 4, line 2, "13" should be --18--

Col. 7, Claim 8, line 2, "at least jute area of the scaling edge" should be --at least in the area of the sealing edge--

Signed and Sealed this

Twenty-eighth Day of December, 2010

David J. Kappos
*Director of the United States Patent and Trademark Office*